United States Patent [19]
Bick et al.

[11] Patent Number: 5,400,300
[45] Date of Patent: * Mar. 21, 1995

[54] SONAR SYSTEM

[75] Inventors: E. Theodore Bick, Palmdale, Calif.; Scott D. Carter, Barrington, R.I.; Bradford W. Edgerton, Newport, R.I.; Cheryl A. Suglia, North Kingstown, R.I.

[73] Assignee: Raytheon Company, Lexington, Mass.

[*] Notice: The portion of the term of this patent subsequent to May 3, 2011 has been disclaimed.

[21] Appl. No.: 209,042

[22] Filed: Mar. 9, 1994

Related U.S. Application Data

[62] Division of Ser. No. 24,546, Mar. 1, 1993, Pat. No. 5,309,408.

[51] Int. Cl.$^6$ .............................................. G01S 15/93
[52] U.S. Cl. ........................................ 367/99; 367/909
[58] Field of Search ................. 367/909, 99, 112, 100, 367/88

[56] References Cited

U.S. PATENT DOCUMENTS 3,886,487  5/1975  Walsh et al. ..................... 367/909
5,142,505  8/1992  Peynaud .......................... 367/909
5,309,408  5/1994  Brick et al. ..................... 367/909

Primary Examiner—Daniel T. Pihulic
Attorney, Agent, or Firm—Donald F. Mofford

[57] ABSTRACT

A system for providing advance warning of underwater navigation hazards that threaten safe ship passage is provided. The system includes a sonar transmitter/receiver adapted for mounting on the ship in a forward looking direction. A processor, in response to sonar returns produced by the sonar transmitter/receiver, produces a sonar produced slope profile of a region of the sea bottom in front of the path of the vessel. A memory stores a slope profile of the region of the sea bottom in front of the vessel, such profile being developed from charted depth data. The stored charted depth data developed slope profile is compared with the sonar return produced slope profile to determine whether the sonar produced slope profile and the charted depth data slope profile are consistent with each other. If the sonar return produced slope profile in a region of the sea bottom is greater that a predetermined threshold level (selected to identify a potential forward undersea hazard) and the charted depth data generated profile of such region does not indicate this potential hazard, an anomaly is identified and a signal indicating such anomaly is produced.

17 Claims, 13 Drawing Sheets

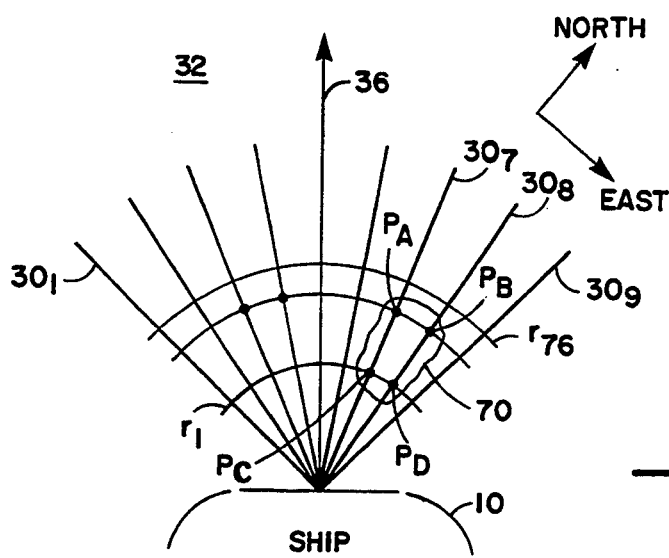
_Fig. 4_
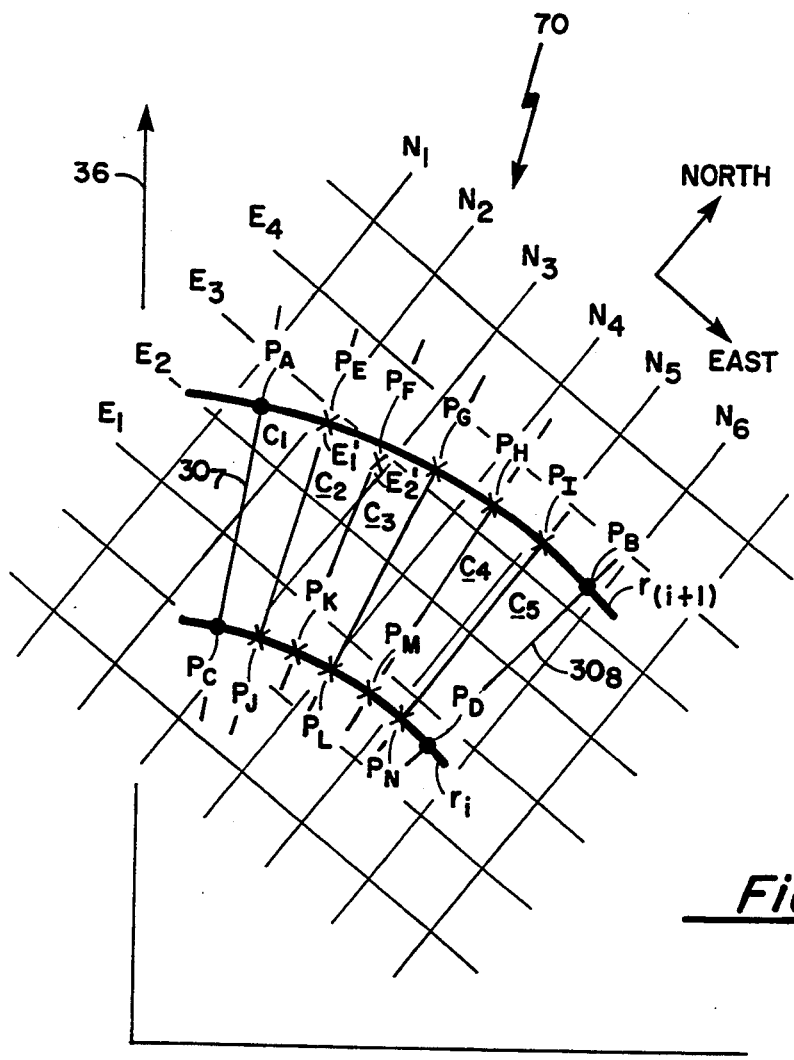
_Fig. 7_

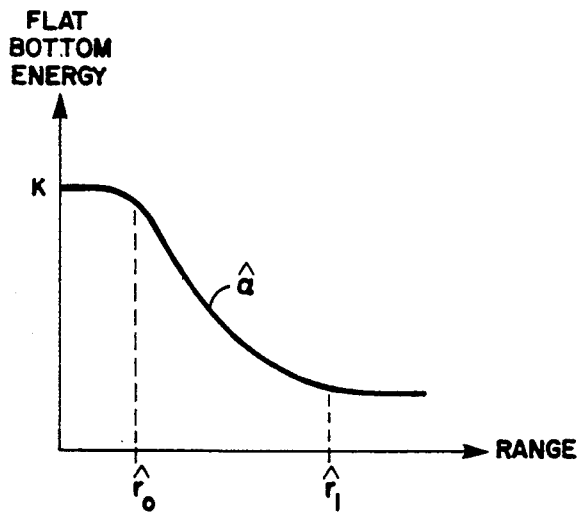
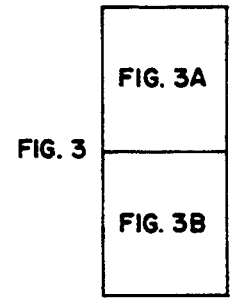
_Fig. 6_
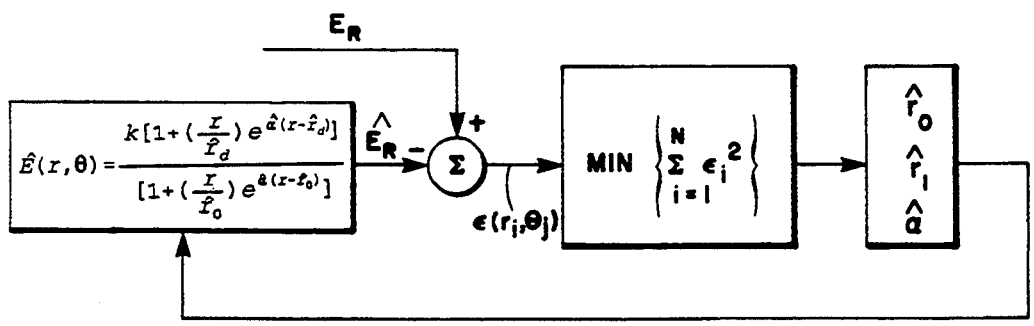
_Fig. 5_
| REGION R(j) | CELLS ASSOCIATED WITH REGION R(j) |
|---|---|
| $R_1$ | $C_{m,n}$; $C_{m,(n+1)}$<br>$C_{(m+2),(n)}$; $C_{(m+3),(n)}$; $C_{(m+4),(n)}$ |
| $R_2$ | $C_{(m+2),(n+2)}$; $C_{(m+2),(n+4)}$; $C_{(m+3),(n+2)}$; $C_{(m+3),(n+3)}$<br>$C_{(m+4),(n+2)}$; $C_{(m+4),(n+4)}$ |
| ⋮ | |
_Fig. 9_

| $C_{m,n}$ 1 | $C_{m,(n+1)}$ 1 | $C_{m,(n+2)}$ 0 | $C_{m,(n+3)}$ 0 | $C_{m,(n+4)}$ 0 | $C_{m,(n+5)}$ 0 |
|---|---|---|---|---|---|
| $C_{(m+1),n}$ 1 | $C_{(m+1),(n+1)}$ 0 | $C_{(m+1),(n+2)}$ 0 | $C_{(m+1),(n+3)}$ 0 | $C_{(m+1),(n+4)}$ 0 | $C_{(m+1),(n+5)}$ 0 |
| $C_{(m+2),n}$ 1 | 0 | $C_{(m+2),(n+2)}$ 1 | $C_{(m+2),(n+3)}$ 0 | $C_{(m+2),(n+4)}$ 1 | $C_{(m+2),(n+5)}$ 0 |
| $C_{(m+3),n}$ 1 | 0 | $C_{(m+3),(n+2)}$ 1 | $C_{(m+3),(n+3)}$ 1 | 0 | 0 |
| $C_{(m+4),n}$ 1 | $C_{(m+4),(n+1)}$ 0 | $C_{(m+4),(n+2)}$ 1 | $C_{(m+4),(n+3)}$ 0 | $C_{(m+4),(n+4)}$ 1 | 0 |
| $C_{(m+5),n}$ 0 | 0 | 0 | 0 | 0 | $C_{(m+5),(n+5)}$ 0 |

Fig. 8

| | | | | | |
|---|---|---|---|---|---|
| ID#$_1$ | ID#$_1$ | 0 | 0 | 0 | 0 |
| ID#$_1$ | 0 | 0 | 0 | 0 | 0 |
| ID#$_1$ | | $C_{(m+2),(n+2)}$ ID#$_2$ | 0 | ID#$_2$ | |
| $C_{(m+3),n}$ ID#$_1$ | 0 | $C_{(m+3),(n+2)}$ ID#$_2$ | $C_{(m+3),(n+3)}$ ID#$_2$ | 0 | 0 |
| $C_{(m+4),n}$ ID#$_1$ | 0 | $C_{(m+4),(n+2)}$ ID#$_2$ | $C_{(m+4),(n+3)}$ 0 | $C_{(m+4),(n+4)}$ ID#$_3$ | 0 |
| 0 | 0 | 0 | 0 | 0 | 0 |

*Fig. 8B*

| | | | | | |
|---|---|---|---|---|---|
| ID#$_1$ | ID#$_1$ | 0 | 0 | 0 | 0 |
| ID#$_1$ | 0 | 0 | 0 | 0 | 0 |
| ID#$_1$ | | $C_{(m+2),(n+2)}$ ID#$_2$ | 0 | $C_{(m+2),(n+4)}$ ID#$_2$ | 0 |
| $C_{(m+3),n}$ ID#$_1$ | 0 | $C_{(m+3),(n+2)}$ ID#$_2$ | $C_{(m+3),(n+3)}$ ID#$_2$ | 0 | 0 |
| $C_{(m+4),n}$ ID#$_1$ | 0 | $C_{(m+4),(n+2)}$ ID#$_2$ | 0 | $C_{(m+4),(n+4)}$ ID#$_2$ | 0 |
| 0 | 0 | 0 | 0 | 0 | 0 |

*Fig. 8C*

SONAR SYSTEM

This application is a divisional of application Ser. No. 08/024,546, filed Mar. 1, 1993, now U.S. Pat. No. 5,309,408.

BACKGROUND OF THE INVENTION

This invention relates generally to sonar systems and more particularly to sonar systems adapted to aid in the detection and avoidance of sea bottom hazards which could damage a sea going vessel's hull.

As is known in the art, charted depth data is used as a primary navigation aid in avoiding reef and other sea bottom hazards. Sometimes this charted depth information changes over time because earth disturbances may create new, previously uncharted hazards. Thus, current underwater hazard avoidance techniques are supplemented with on-board sonar mapping of the sea's bottom. Current sonar imaging provides high resolution of the sea bottom profile when using a vertical, or substantially vertical, depth measurement. However, with the advent of large ocean-going vessels, particularly the new massive oil tankers, early warning of forward navigational hazards is required because of the relatively long intervals of time which are required either to slow down or to change course.

SUMMARY OF THE INVENTION

In accordance with the present invention a system for providing advance warning of underwater navigation hazards that threaten safe ship passage is provided. The system includes a sonar transmitter/receiver adapted for mounting on the ship in a forward looking direction. A processor, in response to sonar returns produced by the sonar transmitter/receiver, produces a sonar produced slope profile of a region of the sea bottom in front of the path of the vessel. A charted data produced slope profile is developed from charted depth data. The charted depth data developed slope profile is compared with the sonar return produced slope profile to determine whether the sonar produced slope profile and the charted depth data slope profile are consistent with each other. If the sonar return produced slope profile in a region of the sea bottom is greater that a predetermined threshold level (selected to identify a potential forward undersea hazard) and, if the charted depth data generated profile of such region does not indicate this potential hazard, an anomaly is identified and a signal indicating such anomaly is produced.

In a preferred embodiment of the invention, the system estimates the energy in sonar returns from a sea having a substantially flat bottom. The energy in sonar returns are then normalized by the estimated flat sea bottom energy to enhance the identification of hazardous high slope sea bottom profile regions.

BRIEF DESCRIPTION OF THE DRAWINGS

For a more complete understanding of the concepts of the invention reference is now made to the following drawings, in which:

FIG. 4 is a diagram showing the angular direction of beams formed by a sonar system used in the anti-collision system of FIG. 2;

FIG. 5 is block diagram of an estimator used by the anti-collision system of FIG. 2 to estimate the flat profile of the sea bottom;

FIG. 6 is a curve representing an equation of the estimated energy of a received sonar signal from reverberations from a flat sea bottom, such equation being used by the estimator of FIG. 5;

FIG. 7 is a diagram showing a portion of the beams of FIG. 4 produced by the sonar system relative to North;

FIG. 8 is a diagram showing an example of sonar produced sea bottom slopes after processing by a threshold level detection process, such slopes being shown for a number of cell positions of the sea bottom, such diagram being useful in understanding a cluster, or region, identification process used to identify regions of the sea bottom having relatively large slopes;

FIGS. 8B and 8C are diagrams useful in understanding the cluster, or region, identification process of FIG. 8;

FIG. 9 is a chart showing the cells of FIG. 8 in various regions identified by the process described in connection with FIGS. 8, 8A, 8B and 8C;

DESCRIPTION OF THE PREFERRED EMBODIMENT

Figure 1:
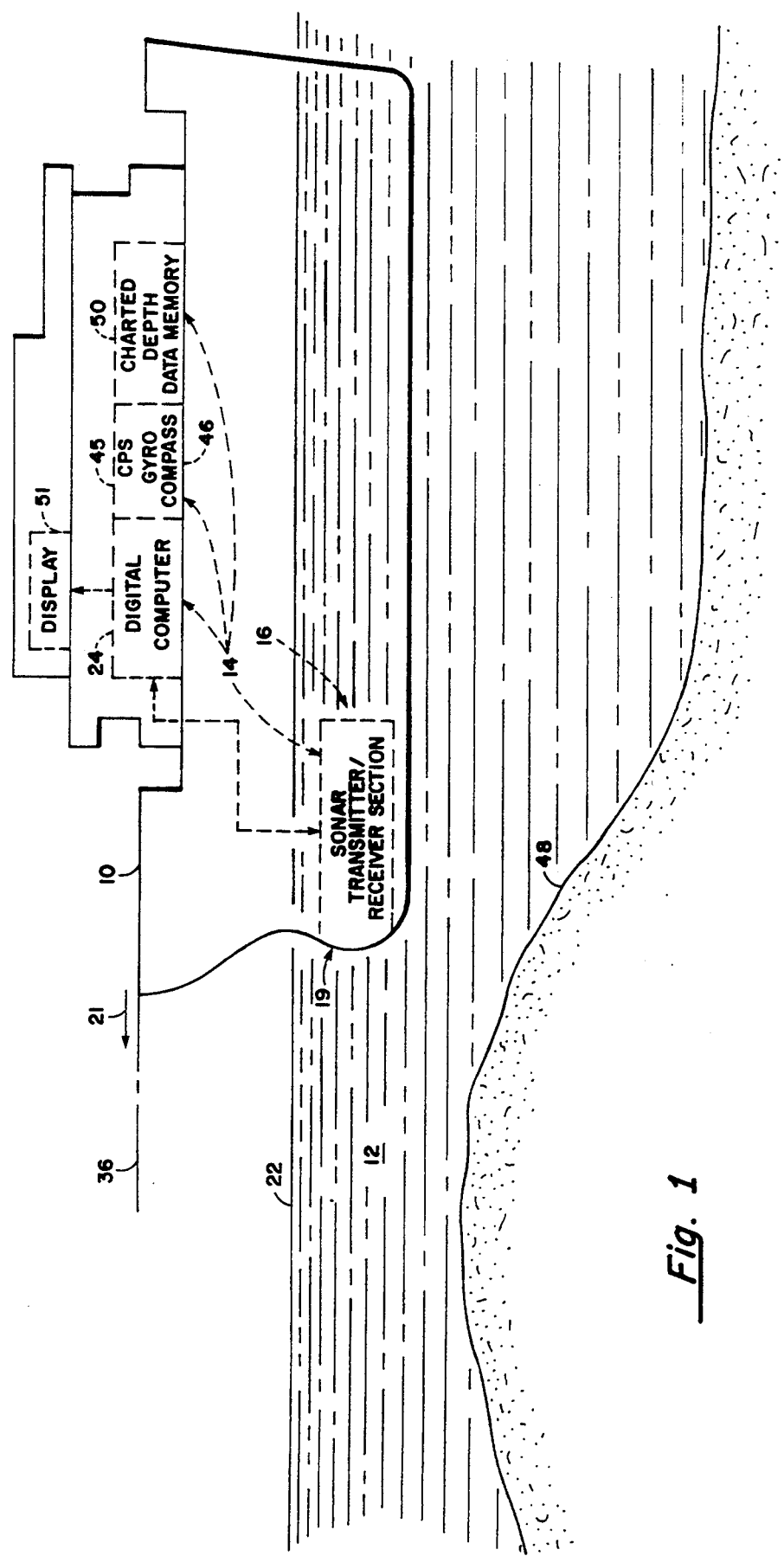
FIG. 1 is a sketch illustrating a ship navigating through a body of water using an anti-collision system according to the invention.
Figure 2:
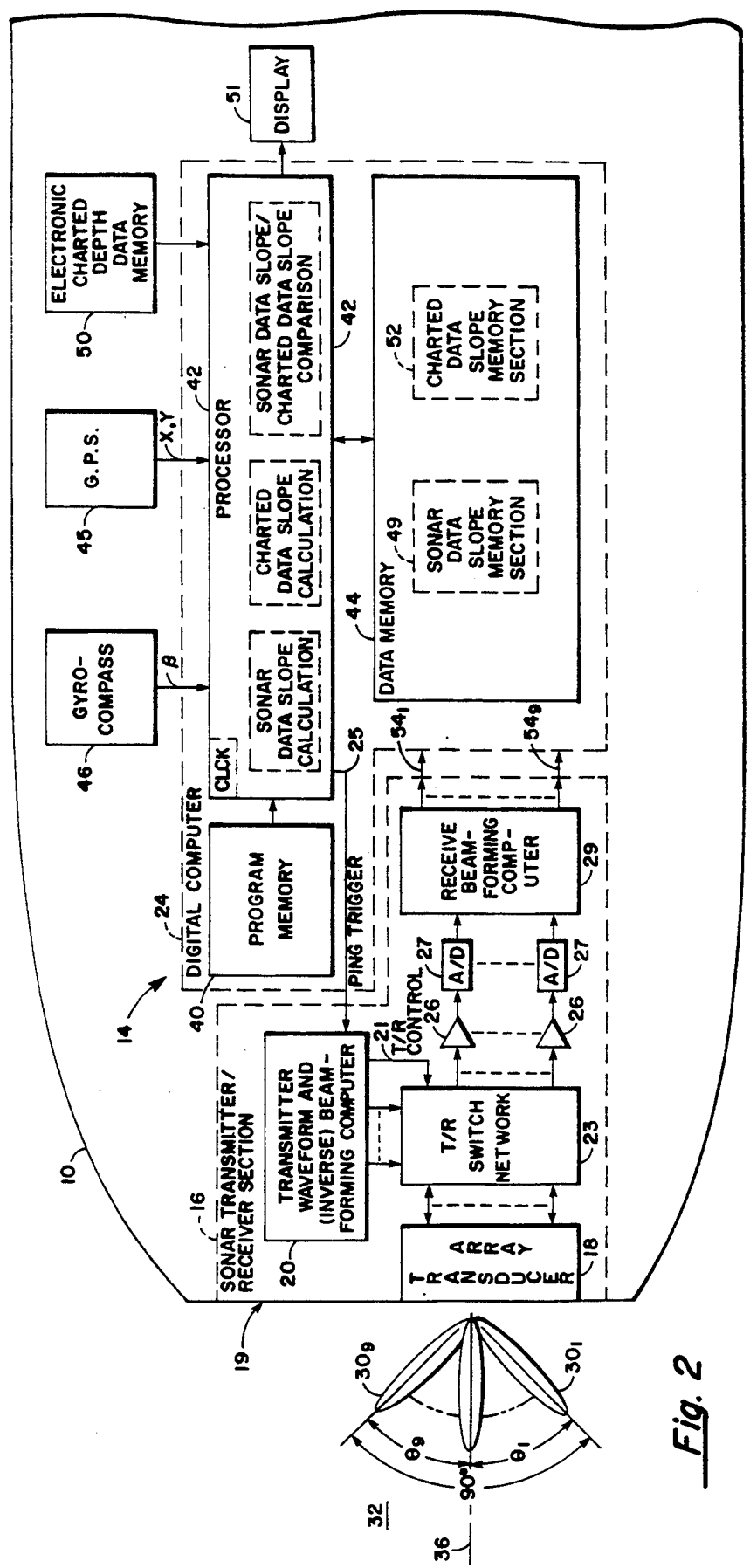
FIG. 2 is a block diagram of the anti-collision system used by the ship in FIG. 1.

Referring now to FIG. 1, a ship 10 is shown navigating through a body of water 12. The ship 10 carries on board an anti-collision sonar system 14. The system 14 provides advance warning of underwater navigation hazards that threaten safe passage for ship 10, particularly hazards in shallow water (i.e., between 10–20 fathoms). The system 14 includes a sonar transmitter/receiver section 16 mounted in a forward position of ship 10, as shown. Referring also to FIG. 2, the transmitter/receiver section 16 includes an array 18, here a cylindrical array of conventional transmitting/receiving transducers mounted in the hull section 19 of ship 10 a sufficient distance below the surface 22 (FIG. 1) of the body of water 12 so that high level sonar pressures can be produced without cavitation. Thus, the sonar transmitter/receiver 16 is adapted for mounting on a sea going vessel, here ship 10, in a forward looking direction 21 (FIG. 1). The system 10 includes a digital computer 24 for sending ping trigger pulses, via line 25, to a conventional sonar transmitter waveform and (inverse) beamforming computer 20. Digital signals produced by computer 20 are converted into analog signals by analog to digital converters (not shown), such converted analog signals being amplified by power amplifiers (not shown), such amplified signals being fed to a transmit/receive switching network 23, in a conventional manner. In response to each ping trigger signal the transmitter waveform and (inverse) beamforming computer 20 transmits an electrical pulse on line 21 initially places the transit/receive (T/R) switching network 23 in a transmit mode. Thus, as is well known, in the transmit mode, the output of the transmitter and waveform (inverse) beamforming computer 20 is coupled to the array 18 of transmitting/receiving transducers 18 so that a ping of sonar energy introduced into the body of water 12. Subsequently, the signal on line 21 changes, and the T/R switching network 23 is placed in the receive mode. Thus, as is well known, in the receive mode the array 18 of transmitting/receiving transducers is coupled to a conventional receiving beam forming network 29 through amplifiers 26 and analog to digital converters (A/D) 27. The receiving beamforming network 29 produces, in a conventional manner, a plurality of, here nine for example, simultaneously existing receiving beams $30_1$–$30_9$ arranged to cover a ninety degree sector 32 in front of the ship 10 (i.e., forty-five degrees on either side of bow line 36). (It should be understood that a larger number of beams than 9 beams., for example 12 beams may be preferable in which case a planar array of transducers may be used). Thus, each one of the beams $30_1$–$30_9$ has a different angular direction. Here, the centerlines of the nine beams $30_1$–$30_9$ have angular deviations from the bow line 36 of ship 10 of: $\theta^1 = -40$ degrees; $\theta_2 = -30$ degrees; $\theta_3 = -20$ degrees; $\theta_4 = -10$ degrees; $\theta_5 =$ zero degrees; $\theta_6 = +10$ degrees; $\theta_7 = +20$ degrees; $\theta_8 + 30$ degrees; and, $\theta_9 = +40$ degrees, respectively. The horizontal beam width of each beam is here 10 degrees (i.e. ±5 degrees about the beam centerline). The centerlines of the beams $30_1$–$30_9$ are substantially parallel with the surface of the body of water. The transmitted acoustic power is here in the order of 10,000 watts.

The digital computer 24 (FIG. 2) includes a program or instruction memory 40, a processor 42 and a data memory 44, all arranged in a conventional manner. Here the digital computer 24 is a Silicon Graphics workstation, Model 4D-35. The program memory 40 stores a set of computer instruction for execution by the processor 42 in a manner to be described. The processor 42, in response to the instructions, processes data stored in one, or more memory sections of the data memory 44 and stores processed data in one, or more, other memory sections of the data memory 44 in a manner to be described in detail hereinafter. (It should be noted that not all sections of the data memory 44 have been given a numerical designation, it being understood that sufficient memory is available in the data memory 44 for the processor 42 to perform various required computations, comparisons and processing described herein). Suffice it to say here, however, that the processor 42, in response to sonar returns produced by the sonar transmitter/receiver 16, global position information (X, Y) of ship 10 supplied by a global positioning system (GPS) 45, ship 10 heading information relative to North, $\beta$, provided by the ship's gyro compass 46 and the instructions stored in program memory 40, calculates a sonar generated data (i.e., echo return generated data) profile of the slope of the sea bottom 48 (FIG. 1) in the sector 32 in front of the path of the ship 10. (i.e. the sector 32 covered by the receiving beams $30_1$–$30_9$). That is, the processor 42 produces a sonar data generated slope profile of a region of the sea bottom 48 in front of the path of the ship based on the sonar return data. This sonar produced slope data is stored in sonar data slope memory section 49 of data memory 44, in a manner to be described. Suffice it to say here, however, that clusters, or regions, in sector 32 are identified as having relatively large, hazard potential, slope profiles.

A charted depth memory 50 is provided for storing charted sea bottom depth information as a function of the global position (X,Y) of the ship 10. The charted depth data information is loaded in the charted depth memory 50 prior to the ship 10's voyage. Such data base is generated by converting paper charts available from the National Oceanographic and Atmospheric Administration (N.O.A.A.) or the Defense Mapping Agency (D.M.A.) into digital information in a form to be described hereinafter. Suffice it to say here, however, that, in response to the global position (i.e., X,Y) of the ship, such information being provided by the global positioning system 50, charted depth information of the sector 32 in front of ship 10 is read from charted depth memory 50 by the processor 42. In response to this read charted depth information, and the heading, $\beta$, of the ship 10, the processor 42 calculates a charted depth data generated slope profile of the sea bottom 48 (FIG. 1) in the sector 32. That is, a slope profile of the sector 32 of the sea bottom 48 in front of the ship 10 based on charted depth data. Such computed, charted depth data generated slope profile is stored in memory section 52 of the data memory 44.

The processor 42, in response to instructions stored in the program memory 40 correlates, or compares, the stored charted data generated slope profile information with the sonar generated slope profile information stored in the sonar data slope memory section 49 to determine whether the latter slope profile is consistent with the former slope profile. If they are not correlated (i.e., consistent one with the other), an anomaly is identified and ship 10 must proceed with caution. Information produced by the computer 24 is fed to a display 51.

More particularly, in response to each sonar ping transmitted, an echo return is received and converted into electrical signals by array 18 in a conventional manner. The electrical signals pass through the T/R switching network 23, amplifiers 26, A/D converters 27 are combined, in a conventional manner, by the receiving beam forming computer 29 to produce digital words on lines $54_1$–$54_9$. As is well known, then, the envelope of the digitized signals on lines $54_1$–$54_9$, respectively, represent the intensities, $I(r, \theta_1)$–$I(r,\theta_9)$, of the sonar returns received by beams $30_1$–$30_9$, respectively, as a function of range, r, measured from the bow 19 of ship 10. Thus, for each one of the nine beams, $30_1$–$30_9$, nine series of digital words are produced. Each one of the digital words in each of the series represents the intensity of the echo return signal at a corresponding range, r, from the bow 19 of ship 10. Here, 76 range samples, corresponding to ranges $r_1$ to $r_{76}$, for each one of the beams $30_1$–$30_9$. The series of digital words $I(r_1,\theta_1)$–$I(r_{76},\theta_1)$ on line $56_1$ through the series of digital words $I(r_1,\theta_9)$–$I(r_{76},\theta_9)$ on line $56_9$, respectively, are fed to the data memory 44, as shown.

Figure 3A:
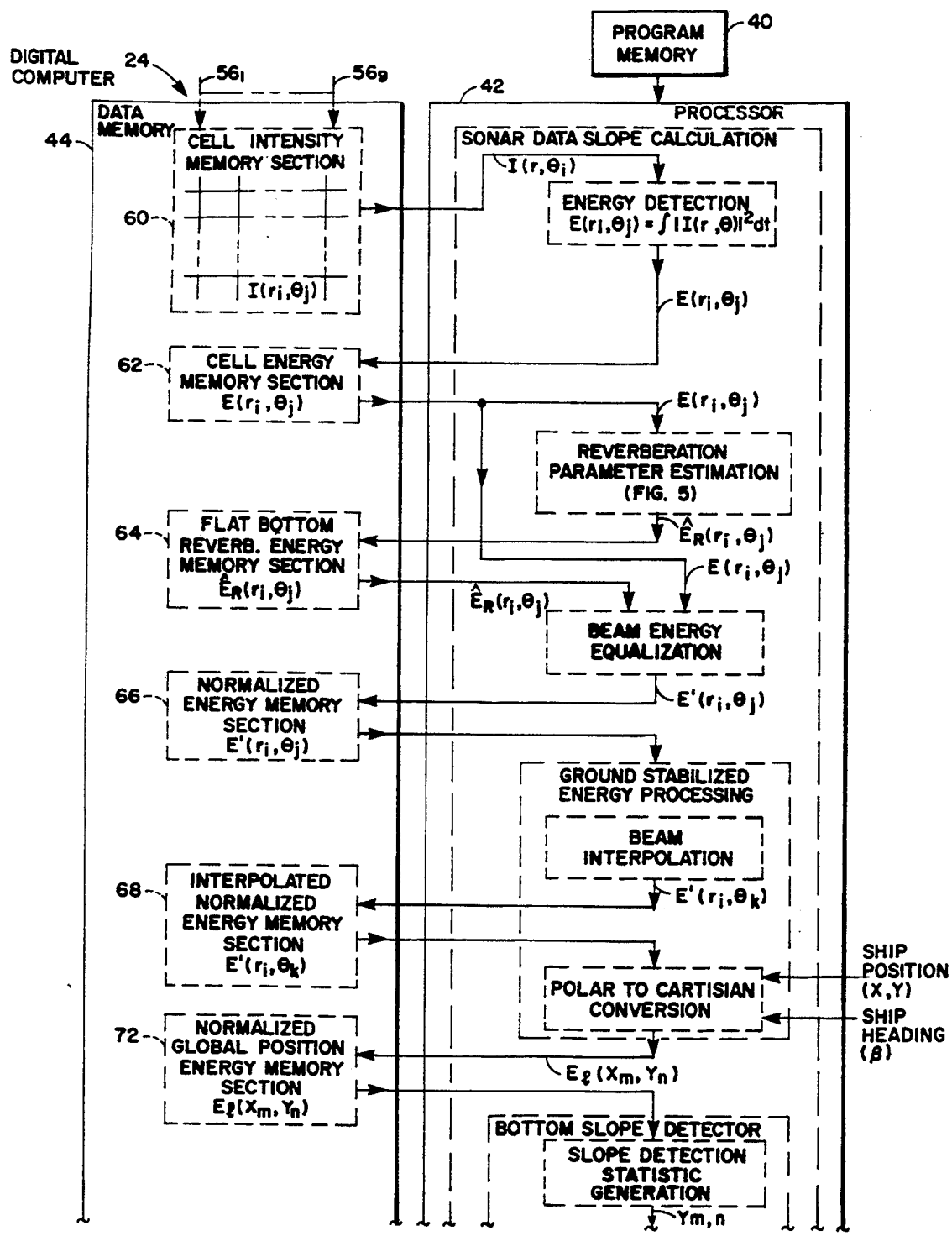
FIG. 3 is a diagram showing the relationship between FIGS. 3A and 3B, FIGS. 3A and 3B being, together, a block diagram of a digital computer used in the anti-collision system of FIG. 2.
Figure 3B:
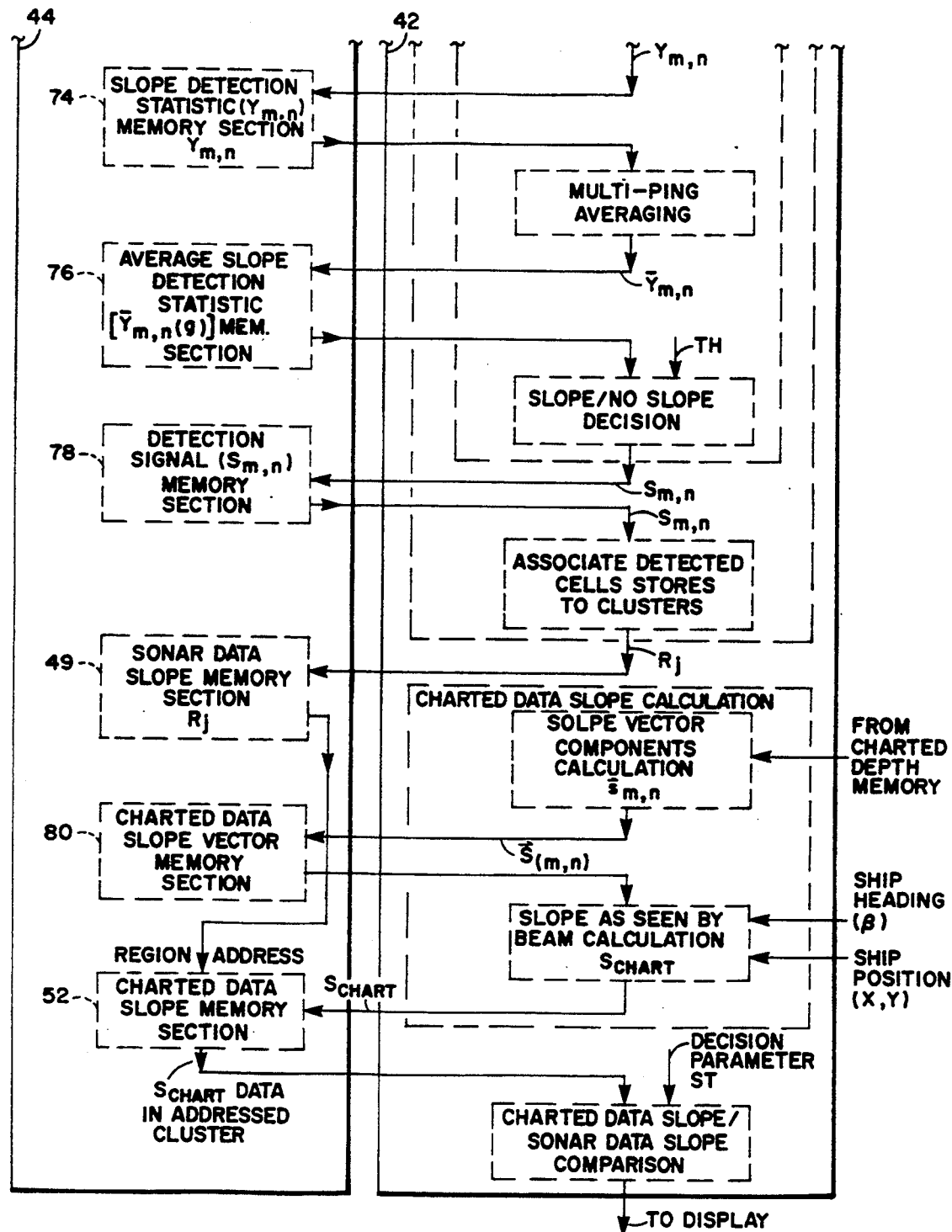

Referring now to FIGS. 3, 3A, and 3B, the digital computer 24 is shown. The series of digital words on each of lines $56_1$–$56_9$ are fed to a position intensity memory section 60 of data memory 44. In response to the instructions stored in the program memory 40, processor 42 produces control signals to enable the digital words on line $56_1$–$56_9$ to become stored in position intensity memory section 60. Thus, memory section 60 may be considered as having a matrix of memory locations, here a matrix of nine columns (i.e., one column for each one of the beams $30_1$–$30_9$) and 76 rows (i.e., one row for each of the 76 range samples). The intensity data stored in a typical position (i,j) in sector 32 (FIG. 2) is therefore, as shown in FIG. 4, $I(r_i,\theta_j)$, where, here, i is an integer from 1 to 76 and j is an integer from 1 to 9.

The intensity data $I(r_i,\theta_j)$ stored in memory section 60 is next read therefrom by processor 42 in response to instructions stored in the program memory 40. The processor 42 then computes the energy $E(r_i,\theta_j)$ in each position (i,j) by integrating over time, t, over the pulse length, $\tau$, in accordance with: $E(r_i,\theta_j) = \int |I(r_i,\theta_j)|^2 \, dt$. The calculated energy, $E(r_i,\theta_j)$ for each of the, here $9 \times 76 = 684$ range—beams positions, is stored in a corresponding one of 684 memory locations of position energy memory section 62 of data memory 44.

In order to enhance echo returns from sea bottom slopes, it is desirable to normalize out of the total sonar return the contribution expected from a sea having a substantially flat bottom. To provide this normalization a mathematical model, or equation, is assumed to characterize flat bottom returns (i.e. reverberations) in "shallow" water. "Shallow" water is defined in the underwater acoustics context, where sound propagation encounters numerous interactions with the sea bottom. In the large ship context "shallow" water is defined as charted water depths from 10 to 20 fathoms.

More particularly, sonar echo returns, in the general case, are made up of both current sea bottom reverberations and non-sea bottom reverberations. The energy in the echo return may be expressed as:

$$I_R(r) = \frac{I_T(r_0)}{(r/r_0)^n e^{\alpha(r-r_0)}} [S_{bf} r_0 \phi \Delta r + S_{bd} r_0 \phi (\Delta Z(r)/\Delta r) \Delta r] + N$$

where: r is range; $r_0$ is the transition range from the source necessary for distributed backscattering; $I_T(r_0)$ is the transmitted sound intensity at $r_0$; n is an integer selected to match the total two way spreading loss (n=2 for cylindrical spreading); $\alpha$ is the attenuation factor resulting from forward scattering losses at the boundaries and absorption loss in the water column; $\phi$ is the horizontal beamwidth; $\Delta z(r)/\Delta r$ is the slope of the vertical discontinuity over $\Delta r$ at r; $S_{bd}$ is the backscattering strength of the bottom discontinuity; $S_{bf}$ is the backscattering strength of the flat bottom; $\Delta r = c\tau/2$ is the processing range resolution; c is the speed of sound; $\tau$ is the active signal pulse length; and, N is the system noise floor. A re-expression of the flat sea bottom portion of the return is made, to facilitate in a least root mean square estimation process to be described hereinafter, Suffice it to say here, however, that such re-expression is:

$$E(r,\theta) = \frac{k\left[1 + \left(\dfrac{r}{r_d}\right)e^{\alpha(r-r_d)}\right]}{\left[1 + \left(\dfrac{r}{r_0}\right)e^{\alpha(r-r_0)}\right]}$$

where, referring also to FIG. 6 (which is a plot of the equation above):

k=the first received energy value of the sonar returns;

$r_0$=the range break;

$r_d$=the range of the day, which is the maximum range of the sonar for the sea conditions of the day;

$\alpha$=the exponential change in energy with range between $r_0$ and a (generally referred to as the absorption loss coefficient).

Thus, the expected flat bottom reverberation energy, $E(r_i,\theta_j)$, for each position (i,j) is computed by first estimating: the first received energy value of the sonar returns, k; $r_0$=the range break; $r_d$=the range of the day; $\alpha$=the change in energy with range between $r_0$ and $r_d$. That is, referring also to FIG. 5, in response to each sonar ping, the sonar detected energy E(i,j) for each position (i,j) is subtracted from an estimated energy, $E_R(r_i,\theta_j)$, for the corresponding position (i,j) and the difference, $e(r_i,\theta_j)$, for each position (i,j) is evaluated. The parameters $r_0$, $r_d$, and $\alpha$ are adjusted to minimize the root mean square error (RMS) $e(r_i,\theta_j)$ for each position (i,j), using conventional (RMS) estimation processing techniques. Thus, there is produced, in response to each ping, one set of parameters for each one of the beams $30_i$–$30_9$. ping. While additional memory sections in the data memory 44 would be used in the estimation processing, such memory sections are not shown. In any event, the estimate, $E_R(r_i,\theta_j)$, of flat bottom "shallow" water reverberation in the region in front of ship 10 (i.e. sector 32, FIG. 2) for each of the $9 \times 76$ positions (i,j) is stored in a corresponding memory location of a flat bottom reverberation memory section 64 (FIG. 3A). Next the processor 42, in response to instructions in the program memory 40, reads the sonar return energy $E(r_i,\theta_j)$ stored in the position energy memory section 62 and the estimated flat bottom reverberation energy, $E(r_i,\theta_j)$ data stored in the flat bottom reverberation energy memory section 64. In response to such read data, the processor 42 normalizes sonar energy data, $E(r_i,\theta_j)$ stored in memory 62 by the estimated flat bottom reverberation energy $E_R(r_i,\theta_j)$ stored in memory 64, to produce, for each position (i,j) a normalized energy, $E'_R(r_i,\theta_j)$, accordance with:

$$E'(r_i,\theta_j) = E(r_i,\theta_j)/E_R(r_i,\theta_j).$$

The normalized energy $E'(r_i,\theta_j)$ for each position (i,j) is stored in a normalized energy position memory section 66.

Next processor 42, in response to the instructions stored in the program memory 40, reads the normalized energy data, $E'(r_i,\theta_j)$, from the normalized energy memory section 66 and increases the number of beam data points from nine to, here, forty-nine, using a conventional interpolation process. That is, the normalized energy $E'(r_i,\theta_j)$ is subtracted from the normalized energy, $E'(r_i,\theta_{(j+1)})$ (i.e. energy at the same range, $r_i$, but at an adjacent beam angle, $\theta_{(j+1)}$. The difference, $\Delta$, in energy (i.e. a $\Delta = E'(r_i,\theta_j) - E'(r_i,\theta_{(j+1)})$ is divided by five and appropriately distributed to pixel positions at the same range $r_i$, but at five "synthesized beam" positions having angular positions between the angle $\theta_j$ and $\theta_{(j+1)}$. Thus, instead of having data for only nine beam positions (i.e. at angle of $-40$, $-30$, $-20$, $-10$, 0, $+10$, $+20$, $+30$, $+40$ degrees, as discussed above), data is generated by the interpolation process for forty additional "synthesized beam positions" (i.e. approximately $-38.3$, $-36.7$, $-35$, $-33.4$, $-31.7$, $-28.3$ . . . $+38.3$ degrees). Thus there are now pixels at positions (i,k) where k is an integer from 1 to 49. The interpolated energy $E'(r_i,\theta_k)$ for each of the forty nine beam positions, $\theta_k$, is stored in an interpolated normalized energy memory section 68.

As noted from the discussion above, the interpolated energy data, $E'(r_i,\theta_k)$, stored in memory section 68 is in polar (i.e. $r\theta$) coordinates. The processor 42, in response to instructions stored in the program memory 40, the global position, X,Y of ship 10, and the bearing, $\beta$, of ship 10 relative to north, N, (FIG. 4), converts the energy data, $E(r_i,\theta_k)$, into Cartesian coordinates (i.e. into $E'(x_m,y_n)$). Here there are $64 \times 64$ cells (i.e. m is an integer from 1 to 64 and n is an integer from 1 to 64). Referring to FIG. 7, a region 70 of sector 32 (FIG. 4) is enlarged. The region 70 is generally near a pair of "actual" sonar beams, here beams 307 and 308. The region 70 is also near a pair of ranges $r_i$, $r_{(i+1)}$, as shown. As described above forty addition "synthesized beams" (shown in FIG. 7) were added by an interpolation process. In FIG. 7, the data points at positions (i, j) associated with the actual beam positions are shown by the symbol (.); here positions $P_A$ and $P_B$, (along range $r_{(i+1)}$) and positions $P_C$ and $P_D$ (along range $r_i$). The interpolated data is represented by the symbol (x); here positions $P_E$, $P_F$, $P_G$, $P_H$, $P_I$ (along range $r_{(i+1)}$), and positions $P_J$, $P_K$, $P_L$, $P_M$, and $P_N$ (along range $r_i$). The polar coordinate positions of the normalized energy $E'(r_i,\theta_k)$ for both the actual and "synthesized" beams are converted to Cartesian coordinate positions. The Cartesian coordinates is referenced to the bow of ship 10 and here has its Y-axis aligned in the North direction and its X-axis aligned in the East direction. Thus, the conversion is made by the processor 42 in accordance with:

$x_{i,k} = r_i \cos [z]$,
$y_{i,k} = r_i \sin [z]$;

where: $x_{i,k}$ is the position of $E'(r_i,\theta)$ along the North-/South direction; $y_{i,k}$ is the position of $E'(r_i,\theta_k)$ along the East/West direction; and, z is the angle between the beam, at angle $\theta_k$, and North (N). A rectangular Cartesian coordinate grid is shown in FIG. 7 superimposed on the polar plotted position points $P_A$ to $P_N$, range line along ranges $r_i$, $r_{(i+1)}$, and the beams $30_7$ and $30_8$. The grid has East/West grid lines $E_1$ to $E_4$, as shown, and North/South grid lines $N_1$-$N_4$, as shown. The North/South grid lines $N_1$-$N_4$ and East/West grid lines $E_1$-$E_4$ define an N x M matrix of row and columns of cells $C_{m,n}$. Here N and M are each 64. Thus, the grid is square having 64 columns of North/South grid lines and 64 rows of East/West grid lines. Each cell $C_{m,n}$ is the region bounded by a pair of successive row grid lines and a pair of successive column grid lines. Thus, each cell $C_{m,n}$ is square in shape, here having a length $\gamma$ and a width $\gamma$. The $x_m$, $Y_n$ position of cell $C_{m,n}$ is in the center of the square region. Thus, FIG. 7 shows cells $C_1$-$C_5$ between North/South grid lines $N_1$-$N_6$ and East/West grid lines $E_2$, $E_3$, for example. The global position of the grid lines, $N_1$-$N_6$, $E_1$-$E_4$ (and hence the global position of the cells, $C_{m,n}$) is known since the global position of ship 10 is known from the global positioning system 44 (FIG. 2). Thus, considering an exemplary one of the cells $C_1$-$C_4$, here cell $C_2$, it is first noted that such cell $C_2$ is bounded by the pair of North/South grid lines $N_2$, $N_3$ and the pair of East/West grid lines $E_2$, $E_3$, as shown. The grid-lines $N_2$, and $N_3$ are at x-axis (i.e. East/West) positions $x_{m-\gamma/2}$, $x_{(m+\gamma/2)}$, respectively and the grid lines $E_2$, $E_3$ are at y-axis (i.e. North/South) positions $y_{(n-\gamma/2)}$, $Y_{(n+\gamma/2)}$, respectively. Thus, cell $C_2$, (i.e. $C_{m,n}$) is at a position in the Cartesian coordinate system of $x_m$, $y_n$. It is also noted that the number of sonar (actual and "synthesized") data points is here $49 \times 76 = 3,724$, (i.e. 3,724 polar plotted position points, P) while the number of cells is here $64 \times 64 = 4,096$. Any one of the cells may have more than one polar plotted position points, P. For example, in FIG. 7, the exemplary cell, $C_{m,n}$, (i.e. cell $C_2$ here has two polar plotted position points, $P_E$ and $P_F$.

The processor 42, in response to instructions stored in the program memory 40, stores the calculated x,y position for all 3,724 normalized energy data, $E'(r_i,\theta_k)$, and stores the results in a memory section, not shown, of the data memory 44. Thus, for each normalized energy data $E'(r_i,\theta_k)$, the x,y position thereof is stored in such memory section. The processor 42, in response to stored instructions, reads such memory section and determines which one of the 4,096 cells $C_{m,n}$, includes such x,y position. The processor 42 also counts the number, $N_{m,n}$ of normalized energy data points (i.e. samples) in each one of the cells (i.e. $N_{m,n}$ is the number of samples in cell $C_{m,n}$). Thus, considering the exemplary cell $C_{m,n}$ (here $C_2$) shown in FIG. 7, such cell $C_{m,n}$ (i.e. $C_2$) has two samples (i.e. $N_{m,n}=2$): $E'_1(x_m,y_n)$, and $E'_2(x_m,y_n)$ (i.e. in the general case, $E'_l(x_m,y_n)$, where l is the number of the energy samples). The 3,724 normalized energy samples, $E'_l(x_m,y_n)$ and the number of samples, $N_{m,n}$ in each of the 4,096 cells, $C_{m,n}$, are stored as data in normalized global position energy memory section 72.

Next, processor 42, in response to instructions stored in program memory 40, reads the 3,724 normalized energy samples, $E'_l(x_m,y_n)$ and the number of samples, $N_{m,n}$ in each of the 4,096 cells, $C_{m,n}$, from the normalized global position energy memory section 72. From such read data the processor 42 computes, for each of the 4,096 cell, $C_{m,n}$, a statistically space and time averaged slope detection characteristic, $Y_{m,n}$. The slope detection statistic, $Y_{m,n}$, is calculated in accordance with the following equation:

$$Y_{m,n} = \frac{1}{M_{m,n}} \sum_{i=1}^{N_{m,n}} \log(1 + |E'_i(x_m,y_n) - 1|)$$

From the equation above it is first observed that the normalized energy samples, $E'_l(x_m,y_n)$, represent the sonar energy level normalized by the estimated energy level for a flat sea bottom. Thus, if the level of the normalized energy sample, $E'_l(x_m,y_n)$ is one (i.e. 1) from the equation above $|E'_l(x_m,y_n)-1|$ will equal 0. Thus, log $(1+|E'_l(x_m,y_n)-1|)$ will equal zero indicating the absence of a sea bottom slope (i.e. the presence of a flat sea bottom). Thus, this portion of the equation will increase in level with increasing sea bottom slope. It is next observed that only large slopes are detected because the log function increases in units of one in response to an order of magnitude (i.e. 10:1) change is sea bottom slope. Finally, it is observed that the equation above averages the calculation, log $(1+|E'_l(x_m,y_n)-1|)$, over all, $N_{m,n}$ energy samples in cell $C_{m,n}$. (This process of forming a detection statistic from multiple spatial samples, as represented by the above equation, is sometimes referred to as a log likelihood ratio detector with a zero velocity hypothesis (i.e. stationary, or flat, sea bottom feature)). The processor 42 stores the 4,096 calculated slope detection statistic, $Y_{m,n}$, in a slope detection statistic memory section 74.

Next processor 42 reads the calculated slope detection statistic, $Y_{m,n}$, from the slope detection statistic memory section 74 and filters (i.e. time averaging) or smooths the statistic, $Y_{m,n}$, over successive pings. This filtering is performed by processor 42 for each of the 4,096 cells $C_{m,n}$, in accordance with the following equation:

$$Y_{m,n}(g) = aY_{m,n}(g) + bY_{m,n}(g-1)$$

where: $a+b=1.0$ and g is the ping index. The parameter a varies linearly with the speed of ship 10. Here, for example, if the speed of ship 10 is 5 knots, and the range $R_{76}$ is 10,000 yards and the length of cell $C_{m,n}$ is 320 yards, $a=0.05$ and $b=0.95$. The process represented by the equation above may be characterized as low pass filtering using a low pass filter with a time constant of (1/a), here 20. Thus, here it takes 20 pings to build up to a steady state value if a step change were made in the slope detection statistic, $Y_{m,n}$. The calculated average slope detection statistic, $\overline{Y}_{m,n}(g)$, is stored in average slope detection statistic memory section 76.

Processor 42, in response to instructions stored in the program memory 40, reads the average slope detection statistic, $\overline{Y}_{m,n}(g)$, from memory section 76 and determines, for each cell C(m,n), whether the sonar has detected a statistically significant slope in such cell C(m,n) of concern to the safety of the ship. More particularly, the average slope detection statistic $[\overline{Y}_{m,n}(g)]$ is compared with a threshold level, TH. A typical default threshold level is 1; however, the threshold level can be operator selected. If the average slope detection statistic $[\overline{Y}_{m,n}(g)]$ is greater, or equal to, the threshold level, TH, the processor 42 produces a detection signal, $S_{m,n}=1$; on the other hand, if the average slope detection statistic $[\overline{Y}_{m,n}(g)]$ is less than 1, the processor 42 produces a detection signal, $S_{m,n}=0$. The detection signals $S_{m,n}$ are stored in a detection signal $[S_{m,n}]$ memory section 78. FIG. 8 shows a portion of the 4,096 cells, here a six by six cell array portion (i.e. cells $C_{m,n}$ to $C_{(m+5,n+5)}$). The detection signals $S_{m,n}$ to $S_{(m+5,n+5)}$ are here indicated as 0 except for the following cells where the detection signals are indicated as 1: $C_{m,n}$; $C_{m,(n+1)}$; $C_{(m+1),n}$; $C_{(m+2),n}$; $C_{(m+3),n}$; $C_{(m+4),n}$; $C_{(m+2),(n+2)}$; $C_{(m+2),(n+4)}$; $C_{(m+3),(n+2)}$; $C_{(m+3),(n+3)}$; $C_{(m+4),(n+2)}$; and, $C_{(m+4),(n+4)}$, as shown.

The processor 42, in response to instructions stored in program memory 40 and data read from the detection signal $[S_{m,n}]$ memory section 78, associates detected cell slopes into clusters, or regions, $R_j$. Thus, there are in this example two clusters, or regions: $R_1$ and $R_2$ (i.e. $j=2$) in the sea bottom. Region $R_1$ is made up of cells: $C_{m,n}$; $C_{m,(n+1)}$; $C_{(m+1),n}$; $C_{(m+1),n}$; $C_{(m+3),n}$; and, $C_{(m+4),n}$ and region $R_2$ is made up of cells: $C_{(m+2),(n+2)}$; $C_{(m+2),(n+4)}$; $C_{(m+3),(n+2)}$; $C_{(m+3),(n+3)}$; $C_{(m+4),(n+2)}$; and, $C_{(m+4),(n+4)}$. The regions, $R_j$, are stored in the sonar data slope memory section 49, as shown in FIGS. 3B and 9. Thus each region, $R_j$, is indexed and the Cartesian coordinate positions of the regions are stored, as indicated.

Figure 8A:
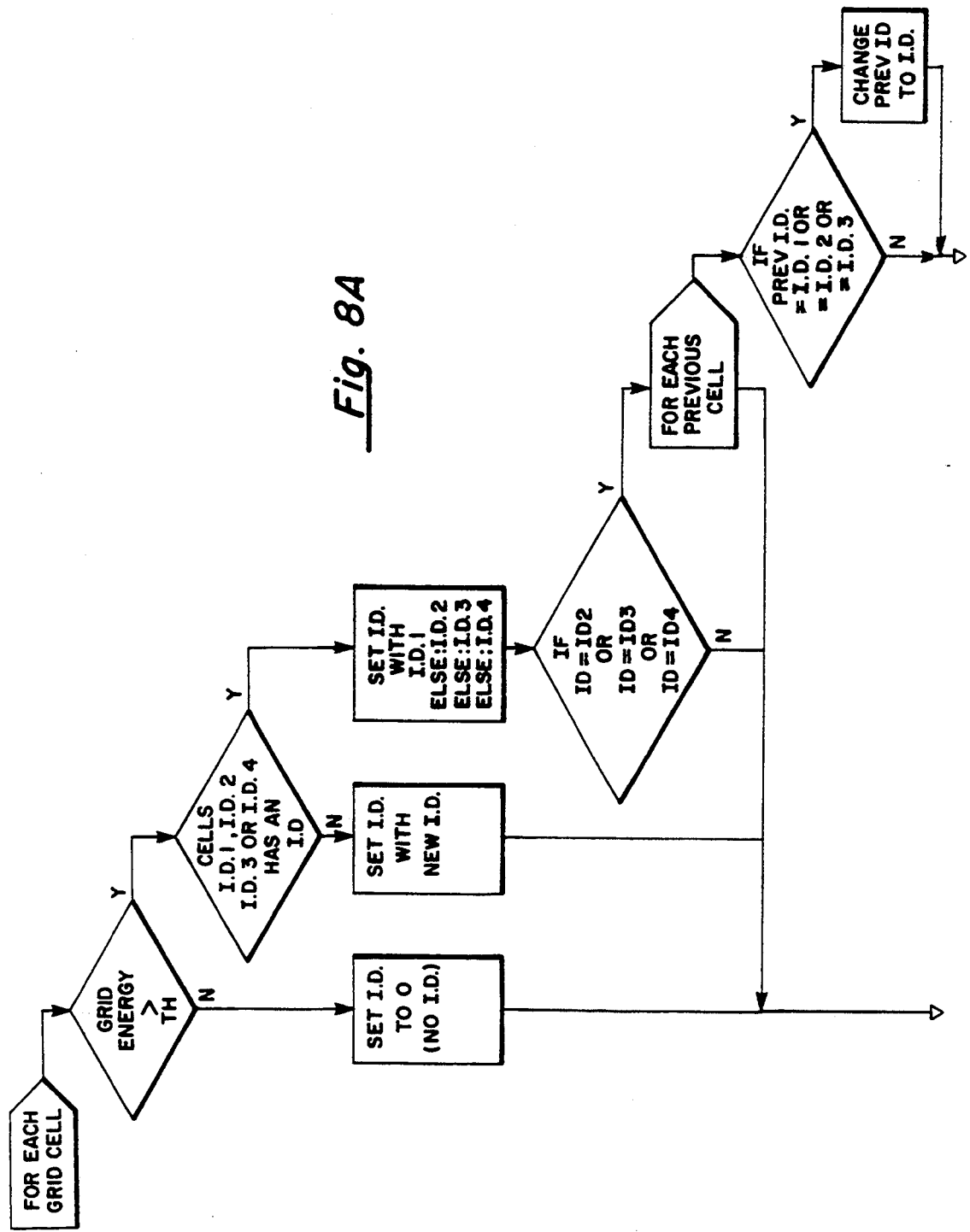
FIG. 8A is a flow diagram useful in understanding the cluster, or region, identification process of FIG. 8.

More particularly, referring to FIG. 8 the processor 42 examines in sequence each of the cells $C_{m,n}$ to $C_{(m+5),(n+5)}$ on a row by row basis. Here, the process starts with the cell in the lower left hand corner (i.e. $Cell_{(m+5),n}$) and continues from left to right (i.e. to $Cell_{(m+5),(n+5)}$), then progresses upward to the next higher row, to $Cell_{(m+4),n}$, and continues, on a row by row basis, until $Cell_{m,(n+5)}$, in this example, is examined. The examination process is summarized by the flow diagram in FIG. 8A and is as follows: If the sonar energy slope. $S_{m,n}$ of the cell being examined did not cross the slope/no slope decision threshold, TH, (i.e. $S_{n,m}=0$) an identification number (ID#) of zero is assigned to the cell. If, on the other hand, the energy slope $S_{m,n}$ of the cell being examined did have an energy level that crossed the threshold, TH, (i.e. $S_{m,n}=1$) a non-zero ID# is assigned to the cell. More particularly, if the examined cell had a level that crossed the threshold, TH, the ID#s assigned to "neighboring" cells of the examined cell are "looked at". (Here the "neighboring" cells to be "looked at" are the cells to the left, bottom left, bottom or bottom right of the examined cell. Thus, referring to FIG. 8, the cells to the left, bottom left, bottom, and bottom right of the $C_{(m+3),(n+3)}$ are: $C_{(m+3),(n+2)}$, $C_{(m+4),(n+2)}$, $C_{(m+4),(n+3)}$, $C_{(m+4),(n+4)}$, respectively). Here, the ID#s of the cells of the "neighboring" cells are "looked at" in the following sequence: first the cell to the left of the examined cell is "looked at", next the cell to the bottom of the examined cell is "looked at", next the cell to the bottom left of the examined cell is "looked at", and finally the cell to the bottom right of the examined cell is "looked at". If none of the "neighboring" cell to the cell being examined have a non-zero ID#, the cell being examined is given the next successive, non-zero ID#. If, however, any of the "neighboring" cells "looked at" has a non-zero ID#, the cell under examination is assigned the ID# of first non-zero ID# in the sequence of "neighboring" cells "looked at" (i.e. the sequence of: left, bottom, bottom left, and finally the bottom right of the examined cell, as discussed above). If the ID# assigned to the cell under examination is the same as the ID# of all cells "neighboring" cell being "looked at", the processor 42 examines the next cell in the process. If, however, a sequentially "looked at", "neighboring" cell, has an ID# different from the ID# assigned to the cell under examination, then each previously examined cell having this different ID# is reassigned the ID# of the cell being examined.

Thus, referring to the example shown if FIG. 8, a zero ID# is assigned for cells $C_{(m+)}$, $C_{(m+5,n+1)}$, $C_{(m+5,n+2)}$, $C_{(m+5,n+3)}$, $C_{(m+5,n+4)}$, $C_{(m+5,n+5)}$, as shown in FIG. 8B, because none of these cells had a level that crossed the threshold level, TH. The next cell examined (FIG. 8) is cell $C_{(m+4),n}$. This cell had a level that did cross the threshold level. Further there are no cells to the left, bottom left, bottom or bottom right of the examined cell that has been assigned a non-zero ID#. Therefore the examined cell, $C_{(m+4),n}$, is assigned the next consecutive ID#, here ID#$_1$, as shown in FIG. 8B. The next cell examined (FIG. 8), $C_{(m+4),(n+1)}$, did not cross the threshold TH and therefore is assigned a zero ID#, as shown in FIG. 8B. The next examined cell (FIG. 8), cell $C_{(m+4),(n+2)}$, has a level that crossed the threshold level. None of the cells to the left, bottom left, bottom, or bottom right to the examined cell has been assigned a non-zero ID#. Therefore the examined cell, here cell $C_{(m+4),(n+2)}$, is assigned the next consecutive non-zero ID#, here ID#$_2$., as shown in FIG. 8B.

The next examined cell is cell $C_{(m+4),(n+3)}$. This cell did not cross the threshold level and therefore it is assigned a zero ID#, as shown in FIG. 8B. The next cell examined is cell $C_{(m+4),(n+4)}$. This cell had a level that crossed the threshold level. None of the cells to the left, bottom left, bottom, or bottom right of the examined cell has been assigned a non-zero ID#. Therefore cell $C_{(m+4),(n+4)}$, is assigned the next consecutive non-zero ID#. Thus, cell $C_{(m+4),(n+4)}$ is assigned ID#3, as shown in FIG. 8B. The next examined cell is cell $C_{(m+4),(n+5)}$. This cell did not cross the threshold level and therefore it is assigned a zero ID#, as shown in FIG. 8B.

The next cell examined (FIG. 8) is cell $C_{(m+3),n}$. This cell had a level that crossed the threshold level. Only one of the cells to the left, bottom left, bottom, or bottom right of the examined cell, here the cell to the bottom of the examined cell (i.e. cell $C_{(m+4),n}$ has been assigned a nonzero ID#, here ID#1. Therefore cell $C_{(m+3),n}$, is assigned the same non-zero ID# as cell $C_{(m+4),n}$. Thus, examined cell $C_{(m+3),n}$ assigned ID#1, as shown in FIG. 8B.

The process continues as shown in FIGS. 8 and 8B. Note however., the examination of cell $C_{(m+3),(n+3)}$. When cell $C_{(m+3),(n+3)}$ is examined, the processor 42 "looks at" the "neighboring" cells in the sequence discussed above. The first "neighboring" cell looked at" is cell $C_{(m+3),(n+2)}$, which here has an ID#2. Thus, cell $C_{(m+3),(n+3)}$ is assigned ID#2. The next cell in the sequence "looked at" is cell $C_{(m+4),(n+2)}$, which has the same ID# as that assigned to cell $C_{(m+3),(n+3)}$, i.e. ID#2. The next cell in the sequence "looked at" is cell $C_{(m+4),(n+3)}$; however this cell has a zero ID# so that the processor 42 skips this zero ID# cell and "looks at" the next, "neighboring" cell in the sequence, here cell $C_{(m+4),(n+4)}$. Cell $C_{(m+4),(m+4)}$ was previously assigned an ID# of ID#3. Thus, the ID# assigned to "neighboring" cell $C_{(m+4),(n+4)}$ is different from the ID# of the cell, $C_{(m+3),(n+3)}$ currently being examined. Therefore, the processor 42 reassigns all cells having the ID# of the "looked at", "neighboring" cell $C_{(m+4),(n+4)}$ (i.e. the ID#3) to the ID# of the cell being examined (i.e. the ID# of the cell $C_{(m+3),(n+3)}$), as shown. (Here, only "neighboring" cell $C_{(m+4),(n+4)}$ has to be reassigned a new ID#, (i.e. ID2), as shown in FIG. 8C. The processor 42 continues, as discussed, to assign the cells ID#'s, as shown for the example in FIG. 8C. Finally, processor 42 groups all cells having the same ID#'s into a common region, R(j), as discussed above in connection with FIG. 9. Thus, as discussed above, there are, in this example- two clusters, or regions: $R_1$ and $R_2$ (i.e. j=2) in the sea bottom. Region $R_1$ is made up of cells: $C_{m,n}$; $C_{m,(n+1)}$; $C_{(m+1),n}$; $C_{(m+2),n}$; $C_{(m+3),n}$; and, $C_{(m+4),n}$ (because all these cells have a common ID#, here all have an ID#1) and region $R_2$ is made up of cells: $C_{(m+2),(n+2)}$; $C_{(m+2),(n+4)}$; $C_{(m+3),(n+2)}$; $C_{(m+3),(n+3)}$; $C_{(m+4),(n+2)}$; and, $C_{(m+4),(n+4)}$ (because all these cells have a common ID#, here all have an ID#2).

Processor 42, in response to instructions stored in the program memory 40, charted depth data stored in charted depth data memory 50, the ship 10 global position (X, Y) obtained from the global position system 44 and the ship 10 heading, $\beta$, relative to North, calculates the slope profile of the sea bottom in front of the ship 10. (It is noted that the slope profile is in the same, Earth, or global, position coordinates as the sonar data slope profile stored in the sonar data slope memory section 49).

Figure 10A:
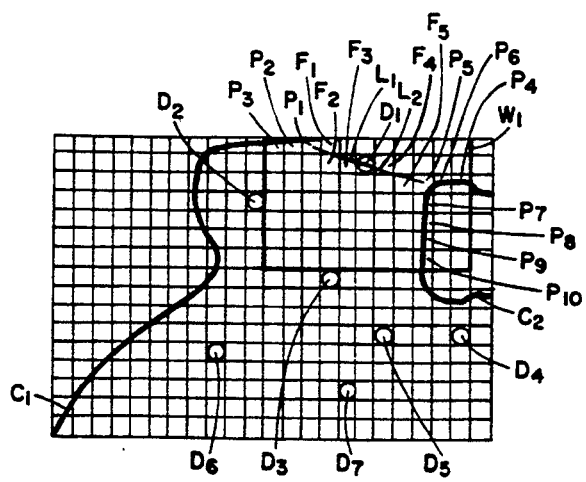
FIGS. 10A to 10E are charts useful in understanding n interpolation process used to generate depth information for determining sea bottom slope information from charted depth information.

Referring to FIG. 10A, a chart, of the of the area where the ship is presently located and called up from the charted depth data base memory 50, is shown. The chart shows depth contour lines, here a pair of contour lines $C_1$ and $C_2$ as well as depth soundings, here seven depth soundings $D_1$–$D_7$. The data representing these contours lines $C_1$, $C_2$ is stored in the data base memory 50 as X,Y positions having the same depth. More particularly, all positions on line $C_1$ have the same depth and all positions on line $C_2$ have the same depth, but the depth of positions on line $C_1$ is different from the depth of positions on line $C_2$. Also, data from contour lines are stored with an index indicating the data is from a contour line. Each sounding data, $D_1$–$D_7$, is stored as a X,Y position, a depth, and an index indicating the data is from a sounding. The processor 50 in response to instructions stored in the program memory 40 stores the contour data and the sounding data, together with their contour/sounding index, in a random access memory (RAM), not shown, but which is here a section of the data memory. Here, the RAM is adapted to stored 1,000×1,000 positions of pixels of data; however in the example shown in FIG. 10A a 22 by 16 array of pixels is shown. The contour lines $C_1$ and $C_2$ together with sounding $D_1$–$D_7$ are shown superimposed on the array of pixels. Thus, here stored data is available for pixels through which a contour line $C_1$ or $C_2$, passes, and data is available for pixels which have soundings $D_1$–$D_7$. It is noted that there are a considerable number of pixels which are empty (i.e. void of depth information from the chart data). The empty pixels are "filled in" through two interpolation processes: first a "nearest neighbor" process; and a then a "rectangular interpolation" process.

In accordance with the stored instructions, the processor 42 reads the data stored in the pixels on a row by row basis until a pixel storing sounding data (as distinguished from contour data) is detected. Thus, in the example, the first sounding pixel meeting this criteria is the data at sounding $D_1$. The processor 42 then selects this pixel for further examination. The processor 42 then determines whether there is any data, from either a neighboring sounding or contour, within a square, eleven by eleven pixel window, W, centered at the pixel under examination. If there are no pixels with data within the window, the process goes to the next sounding. If, on the other hand, there is data within the window, the processor 42 continues to do further processing with the selected pixel. More particularly, the processor 42 identifies the nearest pixel (or pixels if more that one pixel are equidistant from the pixel under examination). The processor 42 then interpolates between the depth of the pixel under examination and the depth of the neighboring pixel and fills with the interpolated data the empty pixels intersected by a line passing between the pixel under examination and the neighboring pixel. If there is data in any pixel intersected by the line, the data in such pixel is not changed. Thus, referring to FIG. 10A, an eleven by eleven window, $W_1$, is placed around the first selected cell, here the cell having the sounding $D_1$. Here, however, because of the boundary of the chart, the window is truncated, as shown along the top boundary. It is next noted that there is data, here from both contour $C_1$ (i.e. data in pixels $P_1$, $P_2$ and $P_3$) and contour $C_2$ (i.e. data in pixels $P_4$–$P_{10}$) within the window. Here pixels $P_1$ and $P_5$ are equidistant from sounding $D_1$. Thus processor 42 interpolates between the depth at pixel $D_1$ and the depth at pixel $P_1$ to thereby fill-in depth data into pixel disposed along (i.e. intersected by) a line $L_1$ between the two pixels $D_1$ and $P_1$ (i.e. pixels $F_1$, $F_2$, $F_3$) and also interpolates along line $L_2$ to fill-in depth data into pixels intersected by line $L_2$ (i.e. pixels $F_4$ and $F_5$).

Figure 10B:
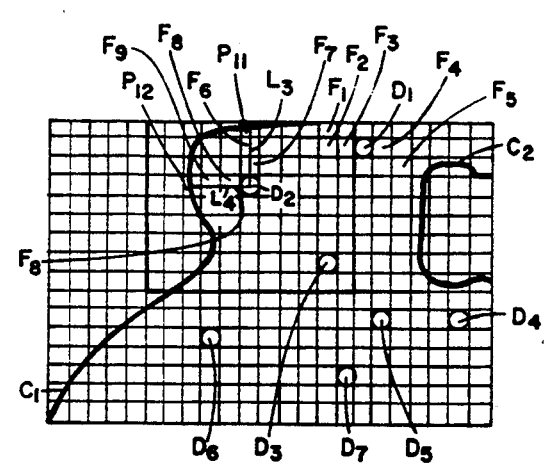

The processor 42 then continues to scan row by row until another sounding is detected, here sounding $D_2$ (see also FIG. 10B). Again the selected sounding $D_2$.

Figure 10C:
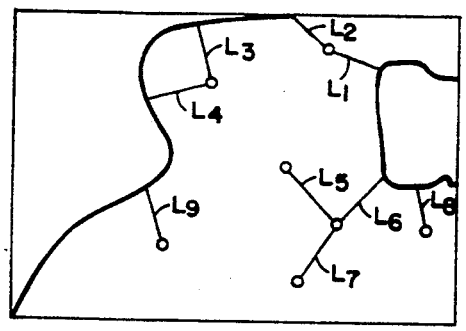

An eleven by eleven pixel window, $W_2$, is placed around the selected pixel, here the pixel having the sounding $D_2$. Here the window $W_2$ encloses pixels having data are those associated with contour $C_1$, sounding $D_3$, and pixels $F_1$-$F_5$ which have interpolated data. Two of the pixels, here pixels $P_{11}$ and $P_{12}$ are closest to the selected pixel $D_2$. (Here the two pixels $P_{11}$ and $P_{12}$ are equidistant from the selected pixel $D_2$). Thus pixels intersected by lines $L_3$ and $L_4$ (i.e. pixels $F_6$-$F_9$) are filled in with interpolated data. It is noted that the distance from the pixel having sounding $D_2$ to the pixel having sounding $D_3$ is greater than the distance between sounding $D_2$ and the pixels $P_{11}$ and $P_{12}$ and thus is not a "nearest neighbor" to be included in the interpolation process. The process continues until all sounding in the chart have been selected. After the first pass through, the chart fills in pixels intersected by lines $L_1$-$L_9$, as shown in FIG. 10C.

Figure 10D:
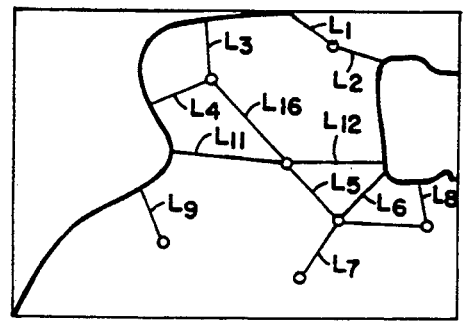
Figure 10E:
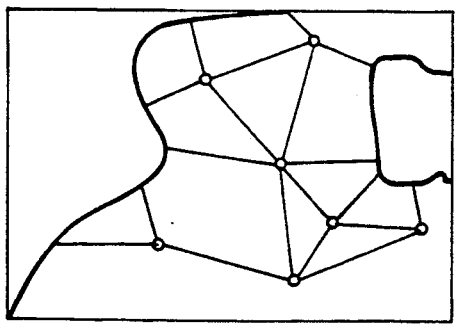

After having selected all soundings, the processor 42 makes a second pass through the chart and again selects the first sounding, here sounding $D_1$. Now, however, the window is increased in size to a thirteen by thirteen pixel window. This process continues until the second pass is completed. The process here fills data into pixels along lines $L_9$, $L_{101}$, $L_{11}$ and $L_{12}$, as shown in FIG. 10D. If the second pass increases the number of previously un-filled pixels by more than two percent, a third pass is made. The process continues and subsequent passes are made through the chart until there is less then a two percent increase in the number of unfilled pixels being filled with interpolated data. When there is less then a two percent increase the second, "rectangular interpolation" is used to complete the interpolation process. In any event, even if there is greater than two percent fill in, the process stops after a 100 by 100 pixel size window is passed through the chart. Here again this first process stops and the second "rectangular interpolation" process begins. FIG. 10E shows the lines added as a result of the "nearest neighbor" interpolation process, for purposes of illustration.

In the "rectangular interpolation" process, the processor 42 scans the stored data row by row, as before. Now, however, the memory also has data interpolated from the "nearest neighbor" process. When the processor 42 detects a filled pixel, here whether the pixel has data from a sounding, or the contour, or from interpolated data, a ten pixel window is searched along a row of the detected cell, beginning at the next pixel after the detected cell. The processor 42 examines all cells in the same row as the detected cell and fills in all the cells therebetween with interpolated data. After the chart is searched row by row, it is then searched column by column. When the processor 42 detects a filled pixel, here whether the pixel has data from a sounding, or the contour, or from interpolated data, a ten pixel window is searched along a column of the detected cell, beginning at the next pixel after the detected cell. The processor 42 examines all cells in the same column as the detected cell and fills in all the cells therebetween with interpolated data. After the chart is searched row by row, and column by column using a ten pixel long window, the window length is increased from a five pixel length to a ten pixel length. The process is successively repeated with window lengths of 20, 50 and 100. The process continues until the window reaches the boundary of the chart.

Figure 11:
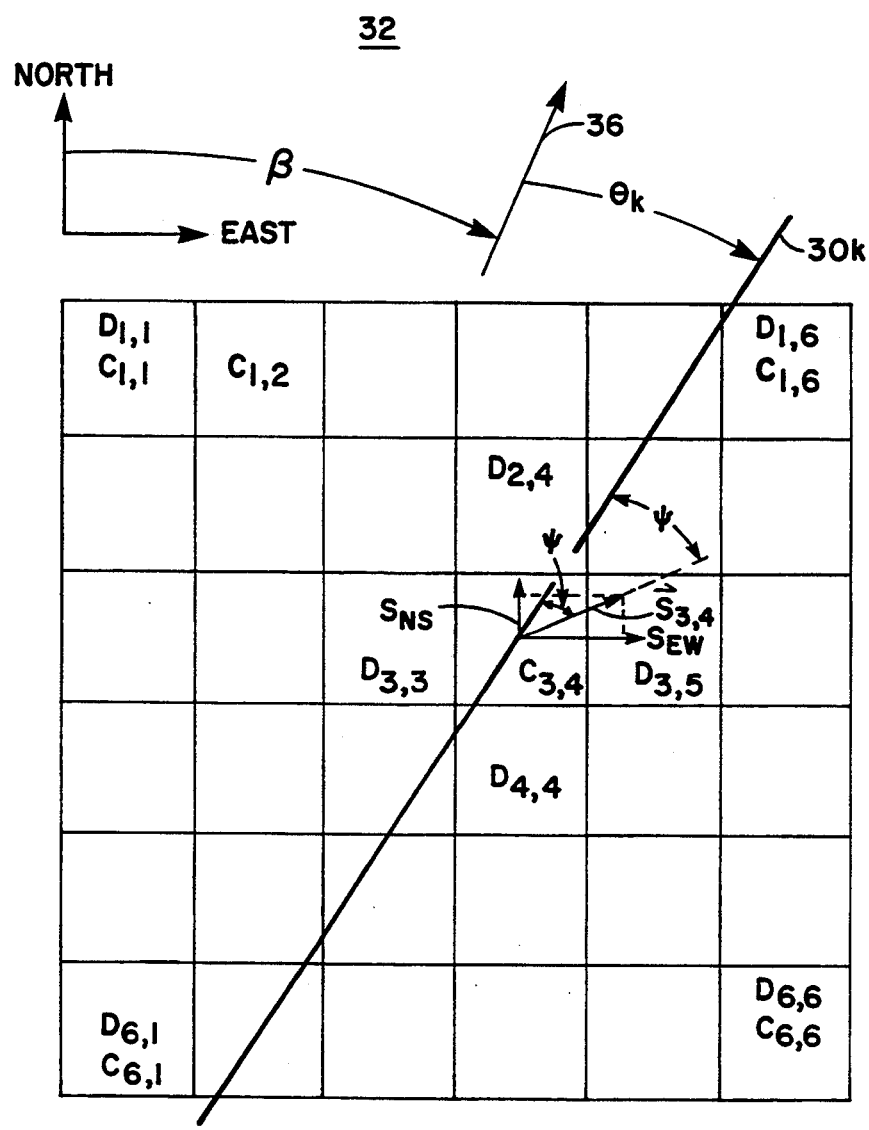
FIG. 11 is a diagram showing the relationship between a sea bottom slope vector, produced from the charted sea bottom information discussed in connection with FIGS. 11A to 11E, and the direction of a beam produced by the sonar system and discussed in connection with FIG. 7; and, FIG. 12 is an exemplary view of a display used in the system of FIG. 1.

Referring to FIG. 11 the interpolated charted depth data of the portion of the sea bottom in front of the ship (i.e. in sector 32, FIG. 2) is shown for as an array of rows and columns of cells $C_{1,1}$ to $C_{(6,6)}$ as depths $D_{1,1}$ to $D_{6,6}$, respectively, as shown. The columns of the cells are in the North/South direction and the rows of the cells are in the East/West direction. (This is the same as the rows and columns of cells shown in FIG. 7 for the sonar data produced slopes). For each of the cells, $C_{m,n}$, a North/South component, $S_{NS}$, and an East/West component, $S_{EW}$, of the slope vector, $S = S_{NS} + j\ s_{EW}$, where $j = \sqrt{-1}$ is calculated by the processor 42. For example, referring to FIG. 11 and exemplary cell $C_{3,4}$: $S_{NS}(3,4) = [D_{2,4} - D_{4,4}]/\delta$, where $\delta$ is the distance between the center of cell $C_{2,4}$ and cell $C_{4,4}$ and, $s_{EW}(3,4) = [D_{3,3} - D_{3,5}]/\delta$. (It is noted that the units of depth $D_{m,n}$ are the same as the units of $\delta$. Thus, slope is a dimensionless ratio). The North/South and East/West slope components $s_{NS}(m,n)$ and $s_{EW}(m,n)$ for each of the cells $C_{m,n}$ are computed as described above. Each computed slope vector, s (m,n) is stored as a complex number in a charted data slope vector memory section 80 (FIG. 3B). Here the data stored in memory section 80 is computed and stored prior to the voyage of ship 10.

The processor 42, in response to the instructions stored in the program memory 40 and the slope vector data stored in the charted data slope vector memory section 80, calculates the charted data based slope in the direction of the one of the 49 sonar beams, $30_k$, where k is an integer from 1 to 49 (i.e. beams $30_1$-$30_9$ as well as the forty "synthesized" beams). Thus, referring again also to FIG. 11, and considering again for example cell $C_{3,4}$, here beam $30_k$ is shown to pass through such cell $C_{3,4}$. Also, beam $30_k$ is at an angle $\theta_k$ from the bow line 36 (FIG. 1) of ship 10. Further, ship 10 has a heading of $\beta$ from North, as shown. The North/South components, $s_{NS}(3,4)$, of the slope vector s (3,4) and the East/West components $s_{EW}(m,n)$ of such vector s (3,4) are shown, along with the resultant slope vector, s (3,4). The angle between the slope vector, s (3,4), and the beam $30_k$ is $\psi$. If the direction of the beam $30_k$ is defined by the unit vector $\mu$ the portion of the slope vector slope, s (m,n) as "seem" by beam $30_k$, but produced by the chart (i.e. the slope $s_{CHART}$) is equal to: $[\mu \cdot$ s (m,n); that is, the dot product of $\mu$ and S (m,n). The slope $s_{CHART}$ is therefore the projection of the resultant slope vector, s (m,n), onto the direction of the beam $30_k$. The slope $s_{CHART}$ for each of the 64 × 64 cells (m,n) is stored in a charted data slope memory section 52 of the data memory 44 (FIG. 3B) at the address location of the cell corresponding thereto. The processor 42, in response to instructions stored in the program memory 40, determines whether there is an anomaly. That is, for each cluster, or region, $R_j$, stored in the sonar data slope memory section 49, the processor 42 uses the cells in the cluster as an address for the charted data slope memory section 52 to read the chart slope data $s_{CHART}$ in the addressed cluster. The processor 42 then determines whether any read chart slope data $s_{CHART}$ contained in any cell in the addressed cluster has a level greater than a $S_{CHART}$ slope threshold, ST, here a slope of 0.5. If so, the cluster and the chart data are consistent and the chart data is considered reliable. On the other hand, if the chart data does not indicate a slope, $s_{CHART}$, greater than the $S_{CHART}$ slope threshold, ST, here 0.5, there is an anomaly between the chart data and the sonar data. Thus, there may be an underwater hazard detected by the sonar that is not on the chart. One possible explanation for the anomaly is the presence of a surface ship.

Figure 12:
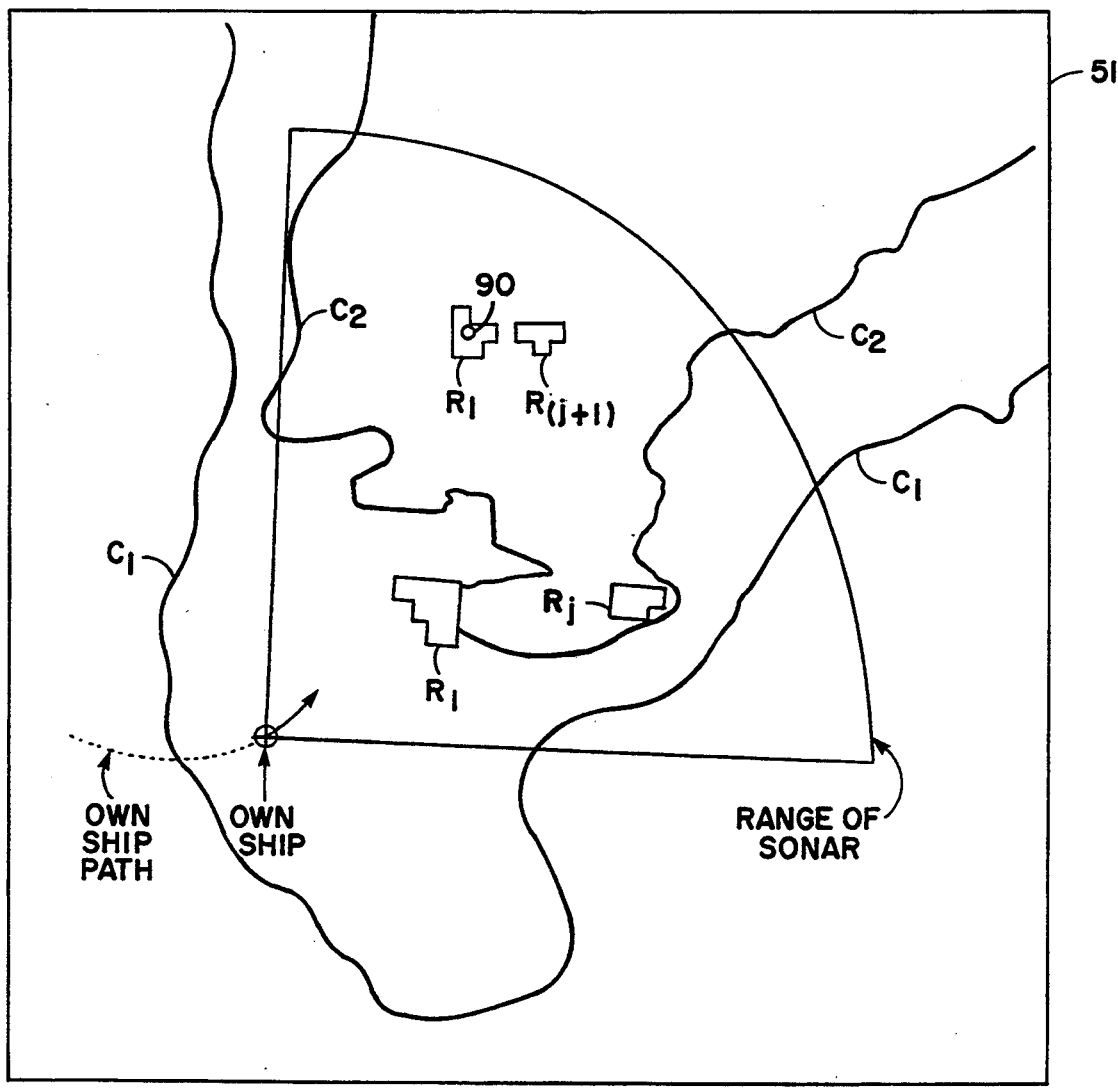

That kind of anomaly is resolved by the ship radar. Information produced by the computer is fed to display 51 (FIG. 1), as shown in FIG. 12. An anomaly is indicated by a circle, 90, as shown. The circle 90 can be displayed in a different color than the regions $R_j$, for example, and/or may be displayed in a "blinking" format.

Having described a preferred embodiment of the invention it will now be apparent to one of skill in the art that other embodiments incorporating its concepts may be used. It is felt, therefore, that this invention shown not be limited by the preferred embodiment but rather should be limited only by the spirit and scope of the appended claims.

What is claimed is:

1. A system for providing advance warning of underwater navigation hazards that threaten safe vessel passage, the system comprising:

means for providing stored charted data generated slope profile information of the sea bottom;

means for providing vessel generated slope profile information of the sea bottom;

means for comparing the stored charted data generated slope profile information with the vessel generated slope profile information; and means, responsive to the comparing means, for determining whether the slope profile in front of the vessel is consistent with the stored charted data generated slope profile information.

2. The system as recited in claim 1 wherein the means for providing slope profile information of the region of sea bottom from vessel generated data comprises:

means for providing a first matrix, having a plurality of columns and a plurality of rows, of data positions, each data position indicative of intensity of a return signal;

means for providing a corresponding second matrix, having a plurality of columns and a plurality of rows, of data positions, each data position indicative of an amount of energy associated from the intensity of the corresponding data position of the first matrix;

means for providing a corresponding third matrix, having a plurality of columns and a plurality of rows, of data positions, each data position indicative of an amount of estimated flat bottom reverberation energy associated with the energy of the corresponding data position of the second matrix;

means for normalizing each data position of the second matrix with the corresponding data position of the third matrix and providing a corresponding fourth matrix, having a plurality of columns and a plurality of rows, of data positions, each data position indicative of an amount of normalized energy associated with the energy of the corresponding data position of the second matrix; and means for converting the fourth matrix from polar coordinates to a fifth matrix in Cartesian coordinates and for calculating for each data position of the fifth matrix an average slope detection statistic to provide a sixth matrix of data positions, each data position having an average slope detection statistic.

3. The system as recited in claim 2 wherein the means for providing slope profile information of the region of sea bottom from vessel generated data further comprises:

means for determining for each data position of the sixth matrix whether a statistically significant slope exists comprising:

means for comparing the average slope detection statistic for each data position with a threshold level; and means for providing, for each data position of the sixth matrix, a detection signal indicative whether the average slope detection statistic for each data position was above the threshold level; and means for associating each data position having an average slope detection statistic above the threshold level into a region.

4. The system as recited in claim 3 wherein the means for associating each data position comprises:

means for examining each data position on a row by row basis; and if the data position includes an average slope detection statistic below the threshold level, for assigning an identification number of zero; and if the data position includes an average slope detection statistic above the threshold level, for examining each neighboring data position; and when no neighboring data positions have a non-zero identification number, for assigning a next successive, non-zero identification number to the data position being examined;

when a neighboring data position has a non-zero identification number and the neighboring data positions have the same non-zero identification number, for assigning the non-zero identification number of the neighboring data position to the data position being examined; and when a neighboring data position has a non-zero identification number and the neighboring data positions have different non-zero identification numbers, for assigning the non-zero identification number of the neighboring data position first examined to the data position being examined and reassigning the same non-zero identification number to any neighboring data position having a different non-zero identification number.

5. A method for providing advance warning of underwater navigation hazards comprising the steps of:

producing a slope profile of a region of the sea bottom in front of the path of a vessel from return signals generated from the vessel;

storing a slope profile developed from charted data;

comparing the slope profile developed from charted data with the slope profile produced from return signals generated from a vessel to determine whether the slope profile in front of the vessel is consistent with the slope profile developed from charted data.

6. The method as recited in claim 5 wherein the comparing step comprises the steps of:

determining, from the charted depth data, a vector representative of the magnitude and global direction of the slope of the bottom of the sea;

producing a receiving beam having a predetermined angular direction; and determining the projection of the slope vector onto the direction of the beam.

7. A method for providing advance warning of underwater navigation hazards that threaten safe vessel passage, the method comprising the steps of:

providing slope profile information of a region of sea bottom from stored charted data;

providing slope profile information of the region of sea bottom from vessel generated data; and comparing the stored charted data slope profile information with the vessel generated data slope profile information.

8. The method as recited in claim 7 further comprising the step of determining whether, when comparing the stored charted data slope profile information with the vessel generated data slope profile information, the slope profile in front of the vessel is consistent with the stored charted data slope profile.

9. The method as recited in claim 8 further comprising the step of providing an indication that an anomaly is identified when the slope profile in front of the vessel is not consistent with the stored charted data slope profile.

10. The method as recited in claim 7 wherein the step of providing slope profile information of the region of sea bottom from vessel generated data comprises the steps of:

providing a first matrix, having a plurality of columns and a plurality of rows, of data positions, each data position indicative of intensity of a return signal;

providing a corresponding second matrix, having a plurality of columns and a plurality of rows, of data positions, each data position indicative of an amount of energy associated from the intensity of the corresponding data position of the first matrix;

providing a corresponding third matrix, having a plurality of columns and a plurality of rows, of data positions, each data position indicative of an amount of estimated flat bottom reverberation energy associated with the energy of the corresponding data position of the second matrix;

normalizing each data position of the second matrix with the corresponding data position of the third matrix and providing a corresponding fourth matrix, having a plurality of columns and a plurality of rows, of data positions, each data position indicative of an amount of normalized energy associated with the energy of the corresponding data position of the second matrix; and converting the fourth matrix from polar coordinates to a fifth matrix in Cartesian coordinates and calculating for each data position of the fifth matrix an average slope detection statistic to provide a sixth matrix of data positions, each data position having an average slope detection statistic.

11. The method as recited in claim 10 wherein the step of providing slope profile information of the region of sea bottom from vessel generated data further comprises the steps of:

determining for each data position of the sixth matrix whether a statistically significant slope exists comprising the steps of:

comparing the average slope detection statistic for each data position with a threshold level; and providing, for each data position of the sixth matrix, a detection signal indicative whether the average slope detection statistic for each data position was above the threshold level; and associating each data position having an average slope detection statistic above the threshold level into a region.

12. The method as recited in claim 11 wherein the step of associating each data position comprises the steps of:

examining each data position on a row by row basis; and if the data position includes an average slope detection statistic below the threshold level, assigning an identification number of zero; and if the data position includes an average slope detection statistic above the threshold level, examining each neighboring data position; and when no neighboring data positions have a non-zero identification number, assigning a next successive, non-zero identification number to the data position being examined;

when a neighboring data position has a non-zero identification number and the neighboring data positions have the same non-zero identification number, assigning the non-zero identification number of the neighboring data position to the data position being examined; and when a neighboring data position has a non-zero identification number and the neighboring data positions have different non-zero identification numbers, assigning the non-zero identification number of the neighboring data position first examined to the data position being examined and reassigning the same non-zero identification number to any neighboring data position having a different non-zero identification number.

13. The method as recited in claim 10 wherein the step of normalizing each data position of the second matrix with the corresponding data position of the third matrix and providing a corresponding fourth matrix further comprises the step of increasing the number of columns of data positions of the fourth matrix to provide additional data positions comprising the steps of:

differencing the amount of energy associated with adjacent data positions to provide a difference value;

dividing the difference by the number corresponding to the number of columns to be increased; and distributing the difference value in steps among the data positions between the adjacent data positions.

14. The method as recited in claim 7 wherein the step of providing slope profile information of a region of sea bottom from stored charted data comprises the steps of:

providing a depth matrix corresponding to the region of the sea bottom, having a plurality of columns and a plurality of rows, of data positions, each data position indicative of depth information; and calculating for each data position of the depth matrix, a slope vector having a north/south component and an east/west component to provide a matrix of slope profile information.

15. The method as recited in claim 14 wherein the step of providing a depth matrix comprises the steps of:

providing a first matrix, having a plurality of columns and a plurality of rows, of data positions including chart provided data positions, depth sounding provided data positions and empty data positions, each chart provided data position indicative of contour data of depth information as provided from contour lines from a chart, each depth sounding provided data position indicative of sounding data of depth information as provided from a depth sounding and each empty data position indicative of no depth information available;

examining each data position for sounding data and upon encountering a sounding provided data position, examining each neighboring data position within a window centered on the sounding provided data position for chart provided data positions and other depth sounding provided data positions and if chart provided data positions and other depth sounding provided data positions are encountered, identifying the nearest data position having depth information and interpolating between the data position under examination and the nearest data position having depth information and providing interpolated data to any empty data position there between;

upon completing the examining step, increasing the size of the window and again performing the examining step until there is less than a two percent increase in the number of unfilled empty data positions;

examining each row of data positions by sliding a window across the columns and filling each unfilled empty data position with interpolated data and then examining each column of data positions by sliding a window across the rows and filling each unfilled empty data position with interpolated data; and increasing the size of the window and repeating the examining each row and each column step until the window reaches the boundary of the matrix.

16. The method as recited in claim 7 wherein the step of comparing the stored charted data slope profile information with the vessel generated data slope profile information comprises the steps of:

calculating, in response to the slope profile information of a region of sea bottom from stored charted data, an angle from a north heading to the bow of the vessel and an angle from the bow of the vessel to a beam heading, slope profile information along the beam heading; and using the slope profile information of the region of sea bottom from vessel generated data to address slope profile information along the beam heading.

17. The method as recited in claim 8 wherein the step of determining whether the slope profile in front of the vessel is consistent with the stored charted data slope profile comprises the step of determining if the stored charted data slope profile is greater than a slope threshold.

* * * * *